United States Patent [19]

Matsui

[11] Patent Number: 5,261,003
[45] Date of Patent: Nov. 9, 1993

[54] DATA COMMUNICATION SYSTEM AND METHOD WITH DATA SCRAMBLING

[75] Inventor: Mitsuru Matsui, Kamakura, Japan
[73] Assignee: Mitsubishi Denki Kabushiki Kaisha, Tokyo, Japan
[21] Appl. No.: 895,629
[22] Filed: Jun. 9, 1992
[30] Foreign Application Priority Data Jun. 13, 1991 [JP] Japan .................................. 3-141911

[51] Int. Cl.$^5$ ........................... H04L 9/16; H04L 9/18
[52] U.S. Cl. ........................................ 380/50; 380/28; 380/47
[58] Field of Search ................. 380/40, 47, 50, 28

[56] References Cited

U.S. PATENT DOCUMENTS

| | | | |
|---|---|---|---|
| 4,791,669 | 12/1988 | Kage | 380/50 X |
| 4,797,921 | 1/1989 | Shiraishi | 380/28 |
| 5,058.164 | 10/1991 | Elmer et al. | 380/4 X |
| 5,081,675 | 1/1992 | Kittirutsunetorn | 380/4 |
| 5,103,479 | 4/1992 | Takaragi et al. | 380/28 |

FOREIGN PATENT DOCUMENTS 62-81145  4/1987  Japan .

OTHER PUBLICATIONS

"Fast Data Encipherment Algorithm FEAL-8", NTT Research Practicing Report, vol. 37, Nos. 4 and 5, 1988.
"Expansion of FEAL Cipher", NTT Review vol. 2, No. 6, Nov., 1990.
"Multi-Media Encryption Algorithm", Multimedia Communication and Dispersed Processing, 40-5, 1989.
"On Differential Cryptanalysis", IEICE Transactions, vol. E74, No. 8, Aug., 1991.

Primary Examiner—Gilberto Barrón, Jr.
Attorney, Agent, or Firm—Wolf, Greenfield & Sacks

[57] ABSTRACT

Data communication system and method with a data scrambling with high security. A data scrambling part is provided with a extended key memory for storing addresses of extended keys, and one of the extended keys is used as a parameter for scrambling an input data to be scrambled. In order to select one of the extended keys to be input to each processing block for converting the input data by using the parameter to output converted data, a selector varies the address of the extended key depending on a plaintext of the input data.

14 Claims, 6 Drawing Sheets

DATA COMMUNICATION SYSTEM AND METHOD WITH DATA SCRAMBLING

BACKGROUND OF THE INVENTION i) Field of the Invention:

The present invention relates to data communication system and method with a data scrambling, and more particularly to an improvement of data communication system and method which perform a digital data array configuration change according to a certain scramble function to carry out a secret communication.

ii) Description of the Related Arts:

Conventionally, a wireless transmission or a transference of various data is carried out for processing the data, it is sometimes necessary to substantially conceal such data.

In such a case, for example, it is useful to prevent a tapping of conversation data in a radio telephone communication, and it is preferable to perform a certain kind of modulation of the conversation data in order not to be understood by an interceptor even when the conversation data to be transmitted by an electric wave are intercepted.

Also, when an ID number of a cash card of a bank or the like can be readily read out by the third party, the safety of the cash card can not be held, and in such a case, it is also preferable to prevent an analysis or decoding of the card data without using a particular read key or password.

Further, in the near future, the spread of an IC card is realized and in certain cases, an ID number for a bank account is written or much other private information considered to be secret is recorded in the card. In order to prevent the ready reading of the private information from the IC card, it is preferable to record the data in the card after the above-described modulation of the data contents.

Accordingly, at the data communication or transference, it is desired to perform the radio or data communication or data recording is performed while the data are made secret as described above.

In the data modulation of this kind, in case of digital data to be handled, the modulated data can be relatively readily made secret, and a simplest and most effective modulation is known as a data scrambling. A principle of a conventional system capable of applying to this scramble modulation will be described hereinbelow.

In FIG. 5, there is shown a data scrambling system using the principle of a conventional data encryption system, for example, a FEAL-8 cipher algorithm, as disclosed in "Fast Data Encipherment Algorithm FEAL-8" by Miyaguchi, Shiraishi and Shimizu, NTT Research Practicing Report, Volume 37, Nos. 4 to 5, 1988. In the drawing, numerals 13 and 14 denote an 8 bytes of plaintext and an 8 bytes of scrambled text, respectively, and the data scrambling system includes a plurality of processing blocks (PBs) 15, 16, 17 and 18 for converting an input signal by using a part of extended keys as a parameter to output a converted signal, a plurality of exclusive logical ORs 21 and an magnification key latch 22 for storing 32 bytes of extended keys.

Next, the operation of the data scrambling system shown in FIG. 5 will now be described. First, an exclusive OR of the input plaintext 13 and the 8 bytes from the 0 byte to the 7 byte of the extended key output from the extended key latch 22 is calculated, and then the exclusive OR of the insignificant 4 bytes and the significant 4 bytes of the calculation result is calculated to output the calculation result to the next step.

Then, the insignificant 4 bytes of the previous step output are input to the processing block 15 and the processing block 15 converts the input signal by using the two bytes from the 8 byte to the 9 byte of the magnification key output from the extended key latch 22 as a parameter to output a converted signal. The exclusive OR of the output of the processing block 15 and the significant 4 bytes of the previous step output is calculated, and the significant 4 bytes and the insignificant 4 bytes of the calculation result are replaced with each other to output the obtained signal to the next step.

Next, the insignificant 4 bytes of the previous step output is input to the processing block 16 and the processing block 16 converts the input signal by using the two bytes from the 10 byte to the 11 byte of the magnification key output from the extended key latch 22 as the parameter to output a converted signal. The exclusive OR of the output of the processing block 16 and the significant 4 bytes of the previous step output is calculated, and the significant 4 bytes and the insignificant 4 bytes of the calculation result are replaced with each other to output the obtained signal to the next step.

Then, the same operation as described above is repeated eight times to the processing block 18. Next, after the significant 4 bytes and the insignificant 4 bytes of the calculation result are replaced with each other, the exclusive OR of the significant 4 bytes and the insignificant 4 bytes is calculated. Further, the exclusive OR of the calculation result and the 8 bytes from the 24 byte to the 31 byte of the extended key output from the extended key latch 22 is calculated to output the scrambled text 14.

In FIG. 6, there is shown a data scrambling system using the principle of another conventional data encryption system, for example, a MULTI-2 cipher algorithm, as disclosed in "Multi-Media Encryption Algorithm", by Takaragi, Sasaki and Nakagawa, Multimedia Communication and Dispersed Processing, 40-5, 1989. In the drawing, numerals 13 and 14 denote a 64 bits of plaintext and a 64 bits of scrambled text, respectively, and the data scrambling system has the same construction as the above-described data scrambling system shown in FIG. 5 except processing blocks (PBs) 15, 16, 17, 18, 19 and 20.

Next, the operation of the data scrambling system shown in FIG. 6 will now be described. First, the input plaintext 13 is divided into significant 32 bits and insignificant 32 bits, and the exclusive OR of the significant 32 bits and the insignificant 4 bits is calculated to output a first calculation result to the processing block 15. The processing block 15 converts the input signal by using the 32 bits from the 0 bit to the 31 bit of the extended key output from the extended key latch 22 as the parameter to output a converted signal. The exclusive OR of the output of the processing block 15 and the significant 32 bits is calculated to output a second calculation result to the processing block 16, and the processing block 16 converts the input signal by using the 64 bits from the 32 bit to the 95 bit of the extended key output from the extended key latch 22 as the parameter to output a converted signal. The exclusive OR of the output of the processing block 16 and the first calculation result of the above-described exclusive OR is calculated to output a third calculation result to the processing block 17, and the processing block 17 converts the input signal by using the 32 bits from the 96 bit to the 127 bit of the extended key output from the extended key latch 22 as the parameter to output a converted signal. The exclusive OR of the output of the processing block 17 and the second calculation result of the above-described exclusive OR is calculated to output a fourth calculation result.

Then, the exclusive OR of the third and fourth calculation results of the above-described exclusive ORs is calculated to output a fifth calculation result to the processing block 18, and the processing block 18 converts the input signal by using the 32 bits from the 128 bit to the 159 bit of the extended key output from the extended key latch 22 as the parameter to output a converted signal. The exclusive OR of the output of the processing block 18 and the fourth calculation result of the above-described exclusive OR is calculated to output a sixth calculation result to the processing block 19, and the processing block 19 converts the input signal by using the 64 bits from the 160 bit to the 223 bit of the extended key output from the extended key latch 22 as the parameter to output a converted signal. The exclusive OR of the output of the processing block 19 and the sixth calculation result of the above-described exclusive OR is calculated to output a seventh calculation result to the processing block 20, and the processing block 20 converts the input signal by using the 32 bits from the 224 bit to the 255 bit of the extended key output from the extended key latch 22 as the parameter to output a converted signal. The exclusive OR of the output of the processing block 20 and the seventh calculation result of the above-described exclusive OR is calculated to output an eighth calculation result, and the eighth calculation result and the seventh calculation result as the significant 32 bits and the insignificant 32 bits are combined to output the scrambled text 14.

Further, another conventional data scrambling system has been proposed, as disclosed in Japanese Patent Laid-Open No. Sho 62-81145. In this case, input data are divided into a plurality of processing blocks, and the positional order configuration change of the processing blocks can be determined by both the input data and a scrambling key. However, in this case, it takes a long time to perform a descrambling.

As described above, in the conventional data scrambling systems, the address of the extended key input to each processing block from the extended key latch 22 is fixed, and hence an interceptor can readily analyze or decode the extended key in a communication path to which a chosen plaintext attack can be conducted.

Furthermore, as described above, in the conventional data scrambling systems, the order of the processing blocks is fixed, and thus the interceptor can analyze all of the extended key in the communication path to which the chosen plaintext attack can be conducted.

SUMMARY OF THE INVENTION

It is therefore an object of the present invention to provide a data communication system with a data scrambling in view of the aforementioned problems of the prior art, which is capable of setting a plurality of kinds of cipher keys and scramble functions to be used in one processing block by varying the cipher keys or the scramble functions depending on an input plaintext to improve random rate and security.

It is another object of the present invention to provide a data communication system with a data scrambling in view of the aforementioned problems of the prior art, which is capable of varying an order of processing blocks depending on an input plaintext to improve random rate and security.

It is a further object of the present invention to provide a data communication method with a data scrambling in view of the aforementioned problems of the prior art, which is capable of setting a plurality of kinds of cipher keys and scramble functions to be used in one processing block by varying the cipher keys and the scramble functions depending on an input plaintext to improve random rate and security.

It is still another object of the present invention to provide a data communication method with a data scrambling in view of the aforementioned problems of the prior art, which is capable of varying an order of processing blocks depending on an input plaintext to improve random rate and security.

In accordance with one aspect of the present invention, there is provided a data communication system with a data scrambling, in which an address of a cipher key or a scramble function to be input to each processing block is varied depending on an input plaintext so as to increase kinds of usable cipher keys or scramble functions in one processing block, comprising:

(a) recording means for storing a plurality of at least any of the cipher keys or the scramble functions;

(b) selecting means for selecting any one of the cipher key or the scramble function from the recording means on the basis of input plaintext data to be scrambled; and (c) scramble processing means for scrambling the input plaintext data on the basis of the selected cipher key or scramble function.

In accordance with another aspect of the present invention, there is provided a data communication method with a data scrambling, comprising the steps of:

(a) inputting plaintext data to be scrambled;

(b) selecting one cipher key or scramble function of a plurality of cipher keys and a plurality of scramble functions on the basis of the input plaintext data;

(c) performing scrambling data to be scrambled on the basis of the selected cipher key or scramble function; and (d) repeating the inputting, selecting and performing steps at least one time to output a scrambled text data.

In these data communication system and method with a data scrambling, since the address of the cipher key or scramble function to be input to each processing block is varied depending on the input plaintext, the numbers of the usable cipher keys or scramble functions in one processing block is increased and a random rate of a cipher text becomes high.

In accordance with a further aspect of the present invention, there is provided a data communication system with a data scrambling, in which in order to raise the random rate, the order of the processing blocks is varied depending on the input plaintext, comprising:

(a) a plurality of processing means for converting respective input plaintext data to be scrambled on the basis of respective cipher keys into respective different ciphers; and (b) cipher selecting means for selecting the cipher keys converted in one of the processing means on the basis of at least a part of the input plaintext data.

In accordance with still another aspect of the present invention, there is provided a data communication method with a data scrambling, comprising the steps of:

(a) converting an input plaintext data to a plurality of scrambled text data on the basis of different cipher keys or scramble functions;

(b) selecting one of the scrambled text data on the basis of the input plaintext data; and (c) repeating the converting and selecting steps at least one time to output a scrambled text.

In these data communication system and method with a data scrambling, since the order of the processing blocks depends on the plaintexts, a cipher sequence is varied each plaintext and thus the random rate of the cipher text becomes high.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
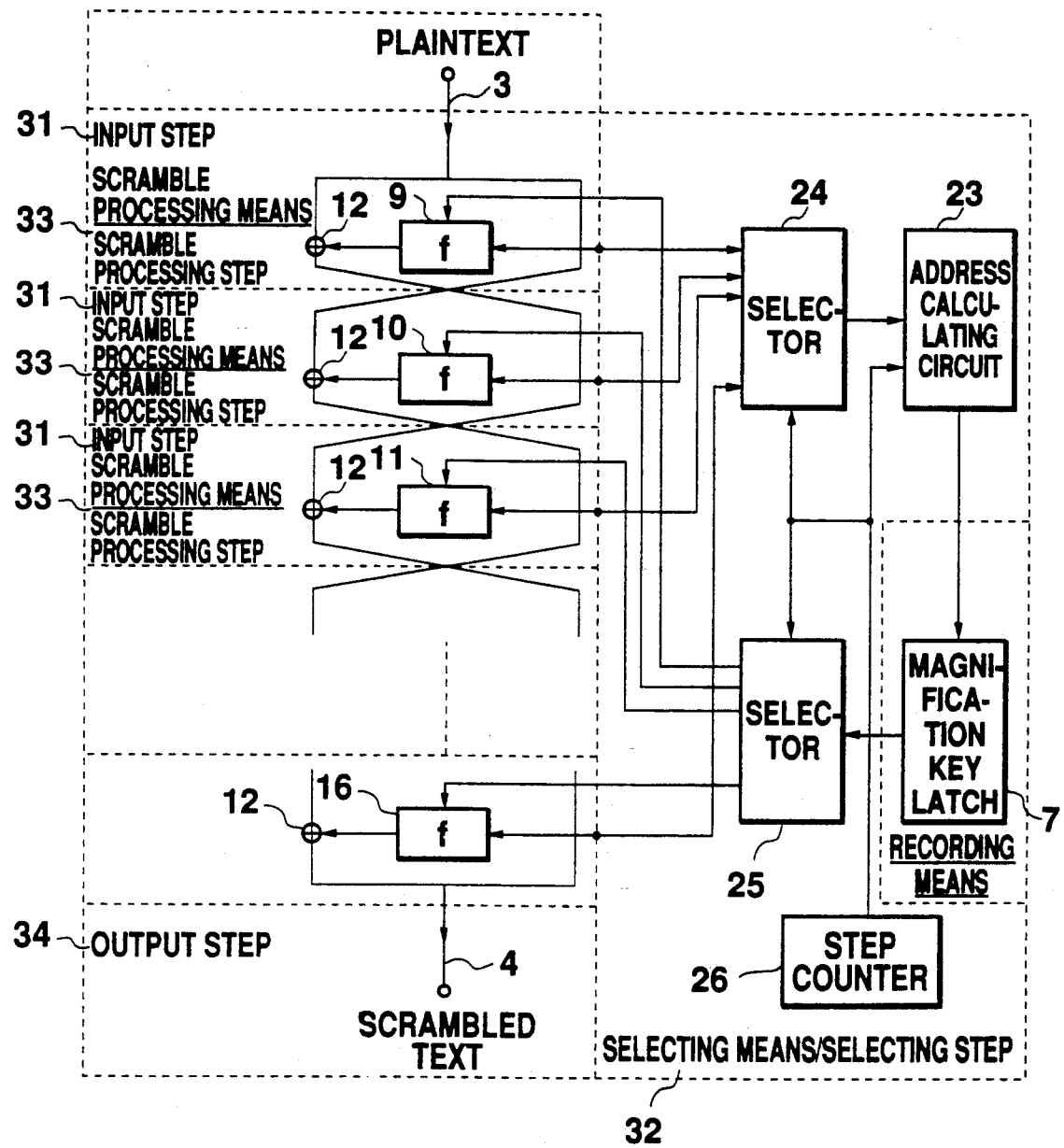
FIG. 1 is a schematic block diagram of a first embodiment of a data communication system with a data scrambling according to the present invention.

Referring now to the drawings, wherein like reference characters designate like or corresponding parts throughout the views and thus the repeated description thereof can be omitted for brevity, there is shown in FIG. 1 the first embodiment of a data communication system with a data scrambling according to the present invention.

As shown in FIG. 1, numerals 3 and 4 denote an 8 bytes of plaintext and an 8 bytes of scrambled text, respectively, and the data communication system with the data scrambling includes a plurality of processing blocks 9 to 16 for converting an input signal by using a part of extended keys as a parameter to output a converted data, a plurality of exclusive logical ORs 12, an address calculating circuit 23 for taking out addresses of the extended keys, a recording means such as a extended key latch 7 for storing a plurality of extended keys, two selectors 24 and 25 and a step counter 26. In this embodiment, the extended key latch 7, the address calculating circuit 23, the two selectors 24 and 25 and the step counter 26 constitute a selecting means 32 for selecting one of the extended keys.

Further, numerals 31, 32, 33 and 34 designate an input step for inputting data to be scrambled, a selecting means or step for selecting one of a plurality of extended keys, a scramble processing means or step for processing the scrambling of the input data, and an output step for outputting the scrambled data, respectively.

Next, the operation of the system shown in FIG. 1 will now be described in detail. At the initial state, the step counter 26 is set to "1", and the selectors 24 and 25 select the processing block 9. First, the input plaintext 3 is divided into more significant 4 bytes and less significant 4 bytes, and the less significant 4 bytes are input to the processing block 9 and the address calculating circuit 23 through the selector 24. The address calculating circuit 23 calculates and address of a extended key to be selected on the basis of the input plaintext data and outputs the calculated address to the extended key latch 7. The extended key latch 7 supplies the selected extended key corresponding to the given address to the selector 25, and the key is transmitted to the processing block 9 through the selector 25. The processing block 9 scrambles the input plaintext data by using the selected key of the selector 25 as the parameter and outputs a scrambled data. Then, in the exclusive OR 12, the output data of the processing block 9 and the more significant 4 bytes of the plaintext 3 are calculated, and the calculated result and less significant 4 bytes of the input plaintext data are replaced with each other to output to a next step.

Then, the step counter 26 counts up to set "2", and the selectors 24 and 25 are prepared to select the processing block 10. The less significant 4 bytes of the output of the first step are input to the processing block 10 and the address calculating circuit 23 through the selector 24. The address calculating circuit 23 calculates the address of the extended key to be selected on the basis of the input data and outputs the calculated address to the extended key latch 7. The extended key latch 7 supplies the selected extended key corresponding to the given address to the selector 25, and the key is transmitted to the second processing block 10 through the selector 25. The processing block 10 scrambles the input data by using the selected key of the selector 25 as the parameter and outputs a secondary scrambled data. Then, in the exclusive OR 12, the output data of the processing block 10 and the less significant 4 bytes of the plaintext data are calculated, and the calculated results of the two scramble processing means are replaced with each other to output to a next step.

Then, the same processing as described above is repeated predetermined times, and the more significant 4 bytes and the less significant 4 bytes of the scrambled data are replaced with each other to obtain the scrambled text 4 to be output.

Figure 2:
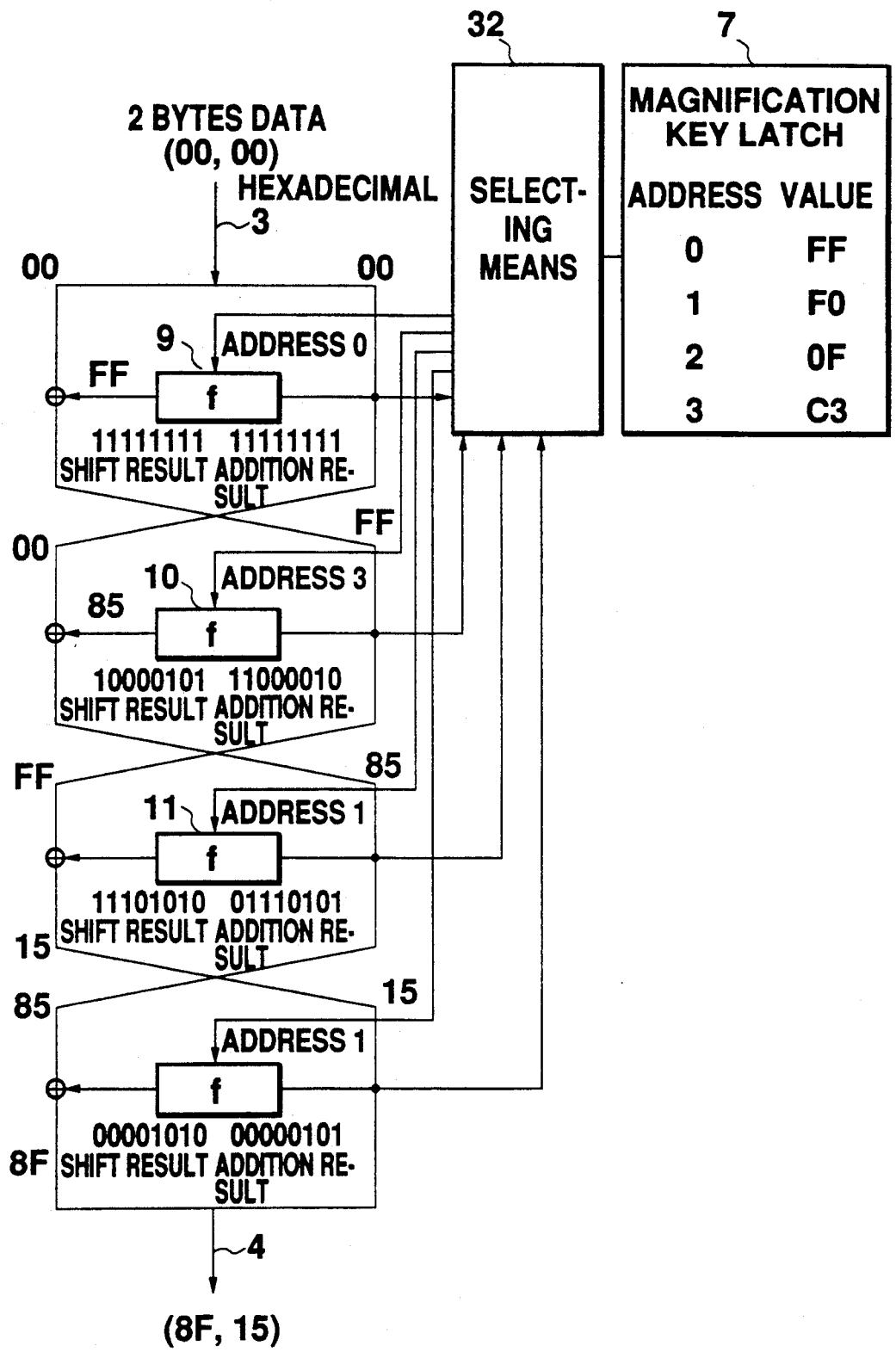
FIG. 2 is a schematic block diagram of a second embodiment of a data communication system with a data scrambling according to the present invention.

In FIG. 2, there is shown the second embodiment of a data communication system with a data scrambling according to the present invention, having the same structure as the first embodiment shown in FIG. 1, except that a 2 bytes of scrambled text 4 is formed from a 2 bytes of plaintext 3 by using 4 steps of processing blocks 9 to 12 for making the explanation simple.

In this embodiment, a scramble function "f" for circularly shifting one bit to the left by adding is provided in each processing block 9, 10, 11 or 12. In this case, a cipher key is added to input data to be scrambled (a less significant 8 bits of the plaintext in the first step), and the MSB (most significant bit) of an addition result is circularly shifted to the LSB (least significant bit). Also, it is considered that in the extended key latch 7 (one example of the recording means), four cipher keys exhibited by a combination of hexadecimal 2 bits, such as, "FF", "F0", "0F" and "C3" are recorded in respective addresses 0 to 3. In the method for selecting one of the four cipher keys, the less significant 2 bits of the input data to be scrambled (the part of the plaintext in the first step) are used as the address of the extended key latch.

The operation of the above-described system will now be described in detail when hexadecimal 2 bytes of data "00, 00" as the plaintext 3 are given under these conditions.

First, the plaintext "00, 00" is divided into a more significant 1 byte and a less significant 1 byte such as "00" and "00". The insignificant 1 byte "00" is input to the first scramble processing block 9 and the selecting means 32. Since the less significant 2 bits of "00" are 00, the selecting means 32 selects the address 0 and "FF" as the extended key. This key "FF" is input to the scramble processing block 9 through the selecting means 32. In the scramble processing block 9, by acting the scramble function f, the cipher key "FF" is added to the less significant 1 byte "00" to obtain 11111111="FF", and then the MSB of the obtained data is circularly shifted to the LBS to obtain a scrambled data 11111111="FF". As a result, the scramble processing block 9 outputs "FF" to a next step.

In the scramble processing block 10 of the second step, the output "FF" of the first scramble processing block 9 is input. Also, the cipher key "C3" at the address "3" of the extended key latch 7 is selected from the less significant 2 bits "11" of the previously scrambled result in the first scramble processing means and is input to the second scramble processing block 10 through the selecting means 32. In the scramble processing block 10, by acting the scramble function f, the cipher key "C3" is added to the input data "FF" to be scrambled to obtain 11000010, and then the MSB of the obtained data is circularly shifted to the LBS to obtain a scrambled data 10000101="85".

Then, the same processing as described above are repeated further two times at the third and fourth scramble processing means, and the scrambled text 4 of "8F, 15" is obtained and is output.

Although the above-described operation is performed for scrambling the input plaintext 3, when the scrambled text 4 is descrambled to the plaintext 3, same manner explained in the above operation can be used except to count down the counter backward.

As described above, according to the present invention, the scrambling system includes at least one scramble processing block which receives the cipher key as the parameter or the extended key output from the cipher key recording means and performs the scrambling of the input data by using the parameter to output the scrambled data, and in one or more processing blocks, the selection of the cipher keys or the extended keys input to the scramble processing blocks is varied depending on the data to be scrambled such as the plaintext.

Further, although the cipher key is selected according to the input plaintext (or the input data to be scrambled) in the above-described embodiments, a plurality of scramble functions f can be stored and proper one of the scramble functions can be selected.

Figure 3:
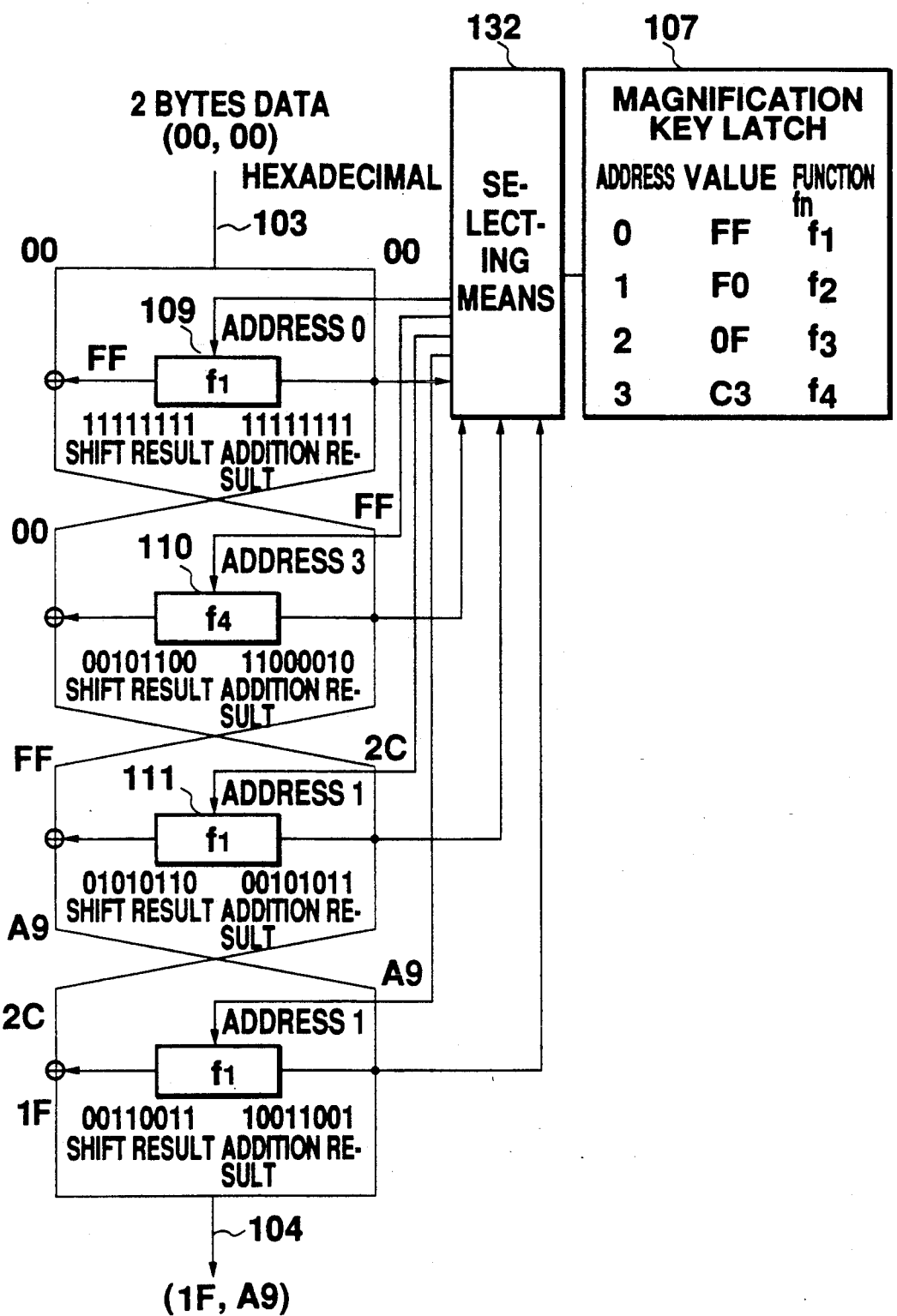
FIG. 3 is a schematic block diagram of a third embodiment of a data communication system with a data scrambling according to the present invention.

In FIG. 3, there is shown the third embodiment of a data communication system with a data scrambling according to the present invention, having the same structure as the first and second embodiments shown in FIGS. 1 and 2, except that a plurality of scramble functions fn such as $f_1$ to $f_4$ are stored in the extended key latch 7. In this scramble function, a cipher key is added to input data to be scrambled, and the MSB of the obtained data is circularly shifted to the LSB by n times. In FIG. 3, corresponding parts to those shown in FIG. 2 denote corresponding numbers added by 100 and thus the detailed description thereof can be omitted for brevity.

In this embodiment, the operation of the system is carried out in the same manner as described above, except that not only the cipher key but also the scramble function fn are selected from the less significant 2 bits of the input data, and each processing block produces the scrambled data by using both the cipher key and the scramble function fn.

Although only cipher key is selected in the previous embodiments or both the cipher key and the scramble function are selected in this embodiment, only the scramble function can be selected according to the present invention.

Figure 4:
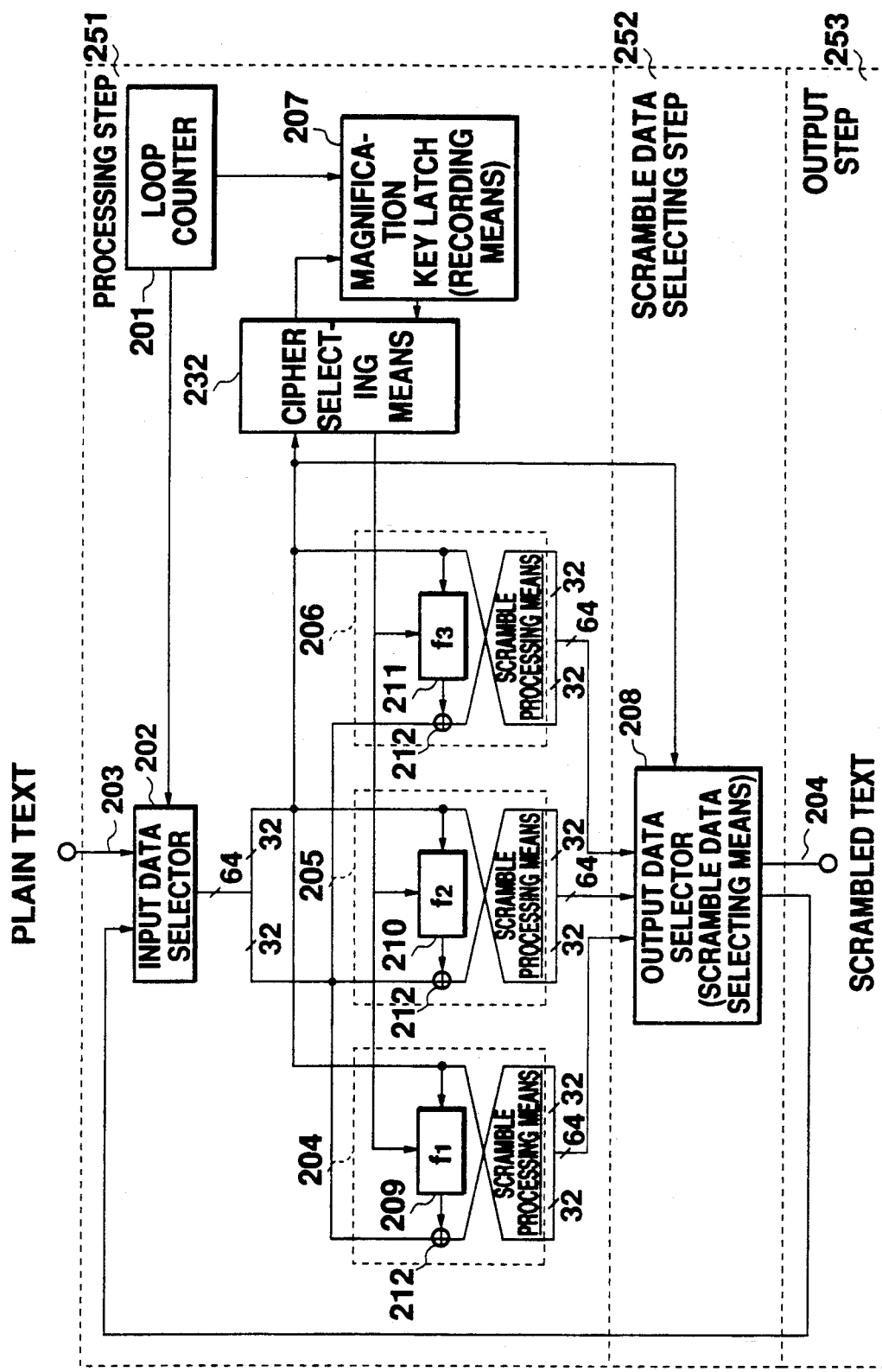
FIG. 4 is a schematic block diagram of a fourth embodiment of a data communication system with a data scrambling according to the present invention.
Figure 5:
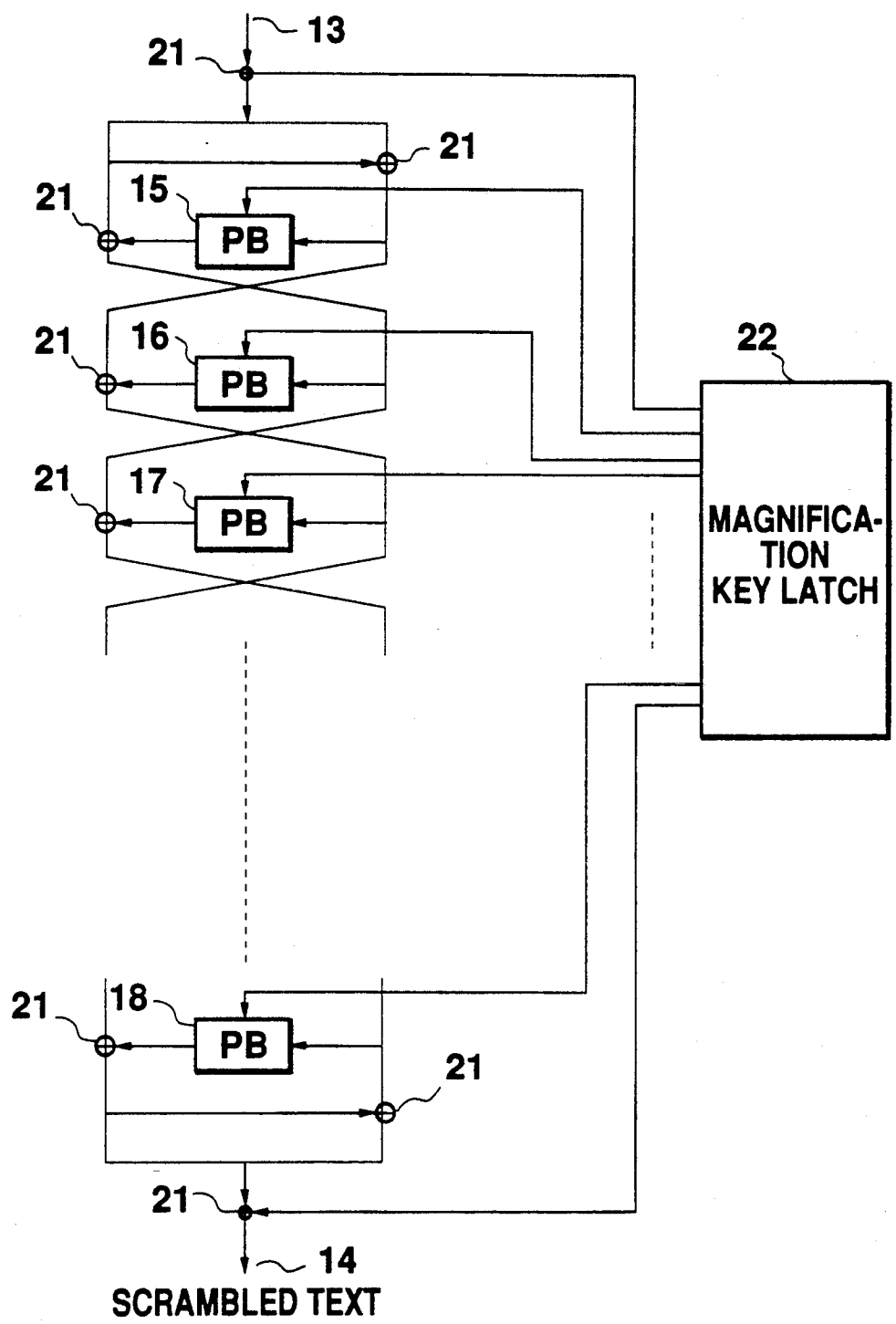
FIG. 5 is a schematic block diagram of a conventional data scrambling system.
Figure 6:
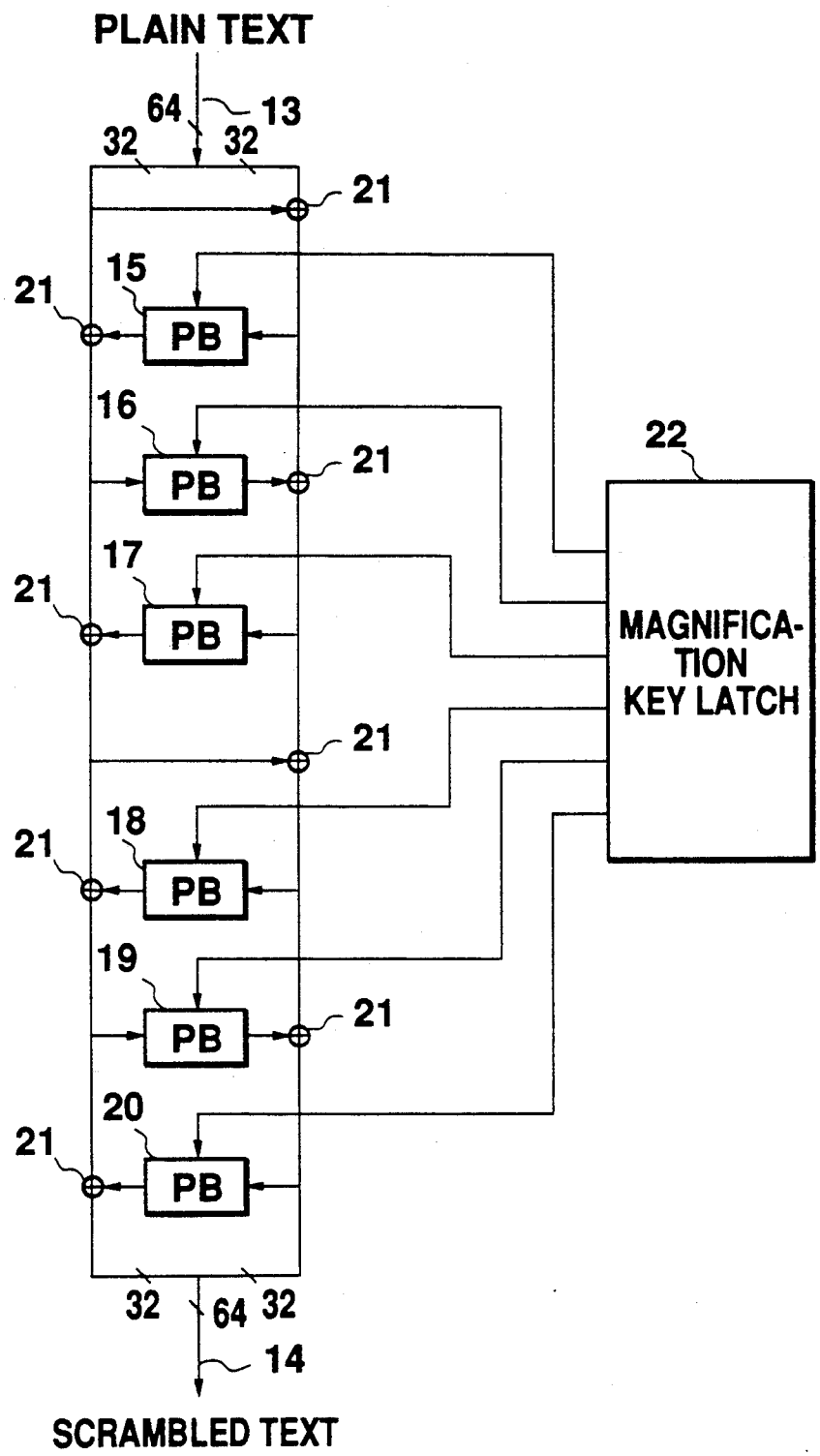
FIG. 6 is a schematic block diagram of another conventional data scrambling system.

In FIG. 4, there is shown the fourth embodiment of a data communication system with a data scrambling according to the present invention. As shown in FIG. 4, the system includes a loop counter 201, an input data selector 202 to receive 64 bits of an input plaintext 203, scramble processing means 204, 205 and 206 for scrambling an input data by using a extended keys as a parameter to output a scrambled data, a extended key latch 207 as a recording means for storing a plurality of extended keys, an output data selector 208 outputting 64 bits of scrambled text 214, scramble processing blocks 209, 210 and 211, exclusive logical ORs 212, and a cipher selecting means 232 having the same structure and function as the selecting means in the previous embodiments.

Further, numerals 251, 252 and 253 denote a processing step for producing a plurality of scrambled data in the scramble processing means 204, 205 and 206, a scrambled data selecting step for selecting one of a plurality of scrambled data produced in the scramble processing step 251, an output step for outputting the scrambled text 214, respectively.

Next, the operation of the system shown in FIG. 4 will now be described in detail. At the initial state, the loop counter 201 is set to "1", and the input data selector 202 selects the input plaintext 203. First, the 64 bits of input plaintext 203 passed through the input data selector 202 is divided into move significant 32 bits and less significant 32 bits. The more significant 32 bits are input to the three exclusive logical ORs 212 and the less significant 32 bits are input to the scramble processing blocks 209, 210 and 211, the cipher selecting means 232 and the output data selector 208. The cipher selecting means 232 calculates an address of a extended key to be selected on the basis of the input 32 bits data and the output of the loop counter 201 by a predetermined method and selects the 32 bits of extended key present at the calculated address to output the selected extended key to all of the scramble processing blocks 209, 210 and 211. In this case, for example, regarding the address calculation method, the address can be determined from the less significant bits as described in the first embodiment, and any particular address calculating can be used.

In the scramble processing means 204, first, the input insignificant 32 bits and the 32 bits of extended key output from the cipher selecting means 232 are input to the scramble processing block 209 and the processing block 209 performs a scramble function transformation to the input data. In the exclusive OR 212, of the output of the processing block 209 and the more significant 32 bits of the plaintext 203 is calculated, and the calculation result and the less significant 32 bits of the input plaintext data are replaced with each other to output the first scrambled data to the output data selector 208. In the second scramble processing means 205, the same processing as that in the first scramble processing means 204 is performed by using the processing block 210 to output the second scrambled data to the output data selector 208. In the third scramble processing means 206, the same processing as that in the scramble processing means 204 is performed by using the processing block 211 to output the third scrambled data to the output data selector 208.

In the output data selector 208, by using the less significant 32 bits of the output of the input data selector 202, one of the outputs of the scramble processing means 204, 205 and 206 is selected and output at the scramble data selecting step 252.

As to which one of the outputs of the scramble processing means 204, 205 and 206 is selected, for example, the selection can be determined by using the lens significant 2 bits of the less significant 32 bits as described in the first embodiment, and also by considering the less significant 32 bits as a numerical value, the selection can be performed by numbers (0, 1, 2) of remainders of a division by 3.

Next, the output of the output data selector 208 is input to the input data selector 202. The loop counter 201 counts up to "2", and the input data selector 202 selects the output of the output data selector 208.

Then, the same processing as described above is repeated predetermined times while the loop counter 201 counts up "1" at a time, and the output of the output data selector 208 is output as the scrambled text 214 to finish the operation at the output step 253.

Although the above-described operation is performed for scrambling the input plaintext, when the scrambled text is descrambled to the plaintext, by selecting the plain text only at the initial time and then the output of the output data selector 208 by the input data selector 202, same manner explained in the above operation can be used except to count down the loop counter 201 backward.

As described above, in this embodiment, the scrambling system includes at least two processing block which receive a part of the cipher key as the parameter or a part of the extended key output from the cipher key recording means and performs the scrambling of the input data by using the parameter to output the scrambled data, and the order of two or more of the processing blocks is varied depending on the plaintext or the data to be scrambled.

In the above-described embodiments, the description is carried out while the cipher key and the extended key are separated from each other, and according to the present invention, the cipher key is considered as the parameter for forming the cipher. Further, according to the present invention, the scramble function is considered as information directly or indirectly exhibiting a process for forming the cipher.

As described above, according to the present invention, since the content of the cipher key or the scramble function to be input to the processing block of each step can be varied depending on the content of the plaintext, high random rate can be obtained and thus the possibility of decoding or analysis of the data communication can be reduced.

Further, according to the present invention, since the selection of the extended keys can be performed depending on the content of the data to be scrambled such as the plaintext in the cipher selecting means, the content of each processing can be varied depending on the content of the data to be scrambled, and thus the high random rate can be obtained so as to reduce the possibility of decoding or analysis of the data communication.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A data communication system with a data scrambling of a bit array configuration of a digital data array of an input plain text according to a predetermined conversion rule, comprising:

scramble processing means containing a scramble function for scrambling digital data by applying input digital data and a cipher key to the scramble function;

recording means for storing a plurality of cipher keys; and selecting means for selecting at least one cipher key from the recording means on the basis of at least a part of the input digital data to supply the selected cipher key to the scramble processing means;

wherein a plurality of the scramble processing means are connected in series, and the selecting means selects a predetermined cipher key from the recording means on the basis of a part of output data of the scramble processing means at a previous step and supplies the selected cipher key to the scramble processing means at a next step.

2. The system of claim 1, further comprising a step counter for counting scrambling steps.

3. A data communication method with a data scrambling of a bit array configuration of a digital data array of an input plain text according to a predetermined conversion rule, comprising the steps of:

selecting one of cipher keys on the basis of at least part of the input digital data array; and performing a scramble processing by applying input digital data and the selected cipher key to a predetermined scramble function;

wherein a plurality of the scramble processing means are connected in series, and the cipher key of the scramble processing on and after a second step is selected from a plurality of cipher keys recorded by using a part of data of a scramble output at a previous step.

4. A data communication method with a data scrambling of a bit array configuration of a digital data array of an input plain text according to a predetermined conversion rule, comprising the steps of:

selecting one of cipher keys on the basis of at least part of the input digital data array; and performing a scramble processing by applying input digital data and the selected cipher key to a predetermined scramble function;

wherein the scramble processing is performed in the following steps:

dividing the input digital data array into significant bits and insignificant bits;

adding a cipher key to insignificant bits data of the input digital data array to obtain an addition result;

circularly shifting the most significant bit of the addition result to the least significant bit of the same to obtain a shift result; and performing an exclusive OR of the shift result and significant bits data of the input digital data array to obtain a calculation result to output the calculation result as the insignificants bits data and the insignificant bits data of the input digital data array as the significant bits data.

5. A data communication system with a data scrambling of a bit array configuration of a digital data array of an input plaintext according to a predetermined conversion rule, comprising:

scramble processing means storable with a scramble function for scrambling digital data by applying input digital data and a cipher key to the stored scramble function;

recording means for storing a plurality of cipher keys and a plurality of scramble functions; and selecting means for selecting at least one cipher key and one scramble function from the recording means on the basis of at least a part of the input digital data to supply the selected cipher key and the selected scramble function to the scramble processing means.

6. The system of claim 5, wherein a plurality of the scramble processing means are connected in series, and the selecting means selects a predetermined cipher key and the scramble function from the recording means on the basis of a part of output data of the scramble processing means at a previous step and supply the selected cipher key and the selected scramble function to the scramble processing means at a next step.

7. The system of claim 6, further comprising a step counter for counting scrambling steps.

8. A data communication method with a data scrambling of a bit array configuration of a digital data array of an input plaintext according to a predetermined conversion rule, comprising the steps of:

selecting one of cipher keys and one of scramble functions on the basis of at least a part of the input digital data array; and performing a scramble processing by applying input digital data and the selected cipher key to the selected scramble function.

9. The method of claim 8, wherein a plurality of the scramble processing means are connected in series, and the cipher key and the scramble function of the scramble processing on and after a second step is selected from a plurality of cipher keys and a plurality of scramble functions recorded by using a part of data of a scramble output at a previous step.

10. The method of claim 8, wherein the scramble processing is performed in the following steps:

dividing the input digital data array into significant bits and insignificant bits;

adding a cipher key to insignificant bits data of the input digital data array to obtain an addition result;

circularly shifting the most significant bit of the addition result to the least significant bit of the same n times to obtain a shift result; and performing an exclusive OR of the shift result and significant bits data of the input digital data array to obtain a calculation result to output the calculation result as the insignificant bits data and the insignificant bits data of the input digital data array as the significant bits data.

11. A data communication system with a data scrambling of a bit array configuration of a digital data array of an input plain text according to a predetermined conversion rule, comprising:

a plurality of scramble processing means connected in parallel, each scramble processing means having an output, each scramble processing means storable with a scramble function for scrambling digital data by applying input digital data and a cipher key to the stored scramble function;

recording means for storing a plurality of cipher keys;

cipher key selecting means for selecting any one of the cipher keys from the recording means on the basis of at least a part of the input digital data to supply the selected cipher key to each scramble processing means; and output selecting means for selecting any one output of the outputs of the plurality of scramble processing means on the basis of at least the part of the input digital data.

12. The system of claim 11, further comprising:

input selecting means for selecting an output of either the input digital data array or the output selecting means and supplying the selected output to each scramble processing means; and a loop counter for counting scrambling times of each scramble processing means.

13. A data communication method with a data scrambling of a bit array configuration of a digital data array of an input plain text according to a predetermined conversion rule, comprising the steps of:

selecting one of cipher keys on the basis of a part of the input digital data array;

performing a plurality of scramble processings in parallel to produce a plurality of scramble outputs by using scramble functions individually given on the basis of input digital data and the selected cipher key; and selecting any one scramble output of the plurality of scramble outputs on the basis of at least a part of the input digital data.

14. The method of claim 13, wherein the performance of a plurality of the scramble processings in parallel is repeated plural times.

* * * * *